United States Patent
Bogliacino et al.

(10) Patent No.: US 11,898,603 B2
(45) Date of Patent: Feb. 13, 2024

(54) BEARING UNIT WITH RETAINING CAGE

(71) Applicant: AKTIEBOLAGET SKF, Gothenburg (SE)

(72) Inventors: Fabio Bogliacino, Cortemilia (IT); Alessandro Ferrero, Turin (IT); Marco Gemello, Nichelino (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/835,260

(22) Filed: Jun. 8, 2022

(65) Prior Publication Data

US 2022/0403884 A1 Dec. 22, 2022

(30) Foreign Application Priority Data

Jun. 17, 2021 (IT) .......................... 102021000015803

(51) Int. Cl.
| | |
|---|---|
| *F16C 33/41* | (2006.01) |
| *F16C 33/38* | (2006.01) |
| *F16C 19/18* | (2006.01) |

(52) U.S. Cl.
CPC .......... *F16C 33/412* (2013.01); *F16C 19/186* (2013.01); *F16C 33/3843* (2013.01); *F16C 33/3887* (2013.01); *F16C 33/418* (2013.01); *F16C 2326/02* (2013.01)

(58) Field of Classification Search
CPC ............... F16C 19/186; F16C 33/3843; F16C 33/3887; F16C 33/412; F16C 33/418; F16C 2326/02
See application file for complete search history.

(56) References Cited

U.S. PATENT DOCUMENTS

| | | | |
|---|---|---|---|
| 2019/0128326 A1* | 5/2019 | Watanabe | ............ F16C 33/3856 |
| 2020/0132119 A1 | 4/2020 | Engelen et al. | |
| 2021/0033147 A1 | 2/2021 | Engelen et al. | |

FOREIGN PATENT DOCUMENTS

| | | | | |
|---|---|---|---|---|
| JP | 2001241448 A | * | 9/2001 | ............ F16C 33/416 |
| JP | 2001289249 | | 10/2001 | |
| JP | 2004060701 | | 2/2004 | |
| JP | 2004286093 | | 10/2004 | |
| JP | 2007285464 | | 11/2007 | |
| JP | 2010196801 | | 9/2010 | |
| JP | 2013068249 | | 4/2013 | |

OTHER PUBLICATIONS

Machine Translation of JP-2001241448-A (Year: 2001).*
Search Report for corresponding Italian Patent Application No. 102021000015803 dated Feb. 28, 2022.

* cited by examiner

*Primary Examiner* — Alan B Waits
(74) *Attorney, Agent, or Firm* — Reed Smith LLP

(57) ABSTRACT

A bearing unit may be provided with at least one row of rolling bodies and at least one cage for retaining the rolling bodies. The at least one rolling cage may include a base rib; a plurality of fingers spaced circumferentially and extending at least from one side of the base rib; and a plurality of partially spherical cavities for holding the rolling bodies, each cavity being defined by the partially spherical concave surfaces of a pair of fingers of the plurality of fingers and of the base rib. The rolling bodies and the cages are in contact with each other via a plurality of protrusions formed on the partially spherical concave surfaces of the fingers and of the base rib. At least one lateral protrusion may be formed along the surface of each finger of the plurality of fingers of the retaining cage.

12 Claims, 4 Drawing Sheets

BEARING UNIT WITH RETAINING CAGE

CROSS-REFERENCE TO RELATED APPLICATIONS

This application is based on and claims priority to Italian Patent Application No. 102021000015803 filed on Jun. 17, 2021, under 35 U.S.C. § 119, the disclosure of which is incorporated by reference herein.

FIELD

The present disclosure relates to a bearing unit provided with a retaining cage.

BACKGROUND

A conventional retaining cage for rolling bodies, in particular balls, of a bearing unit, according to a first type, is formed by a circular base rib and a plurality of circumferentially spaced fingers which extend from both sides of the rib. The base rib and the fingers have partially spherical concave surfaces defining together a plurality of partially spherical pockets or cavities for holding respective balls.

BRIEF DESCRIPTION OF THE DRAWINGS

The disclosure will now be described with reference to the accompanying drawings which illustrate non-limiting exemplary embodiments thereof, in which.

DETAILED DESCRIPTION

Figure 1:
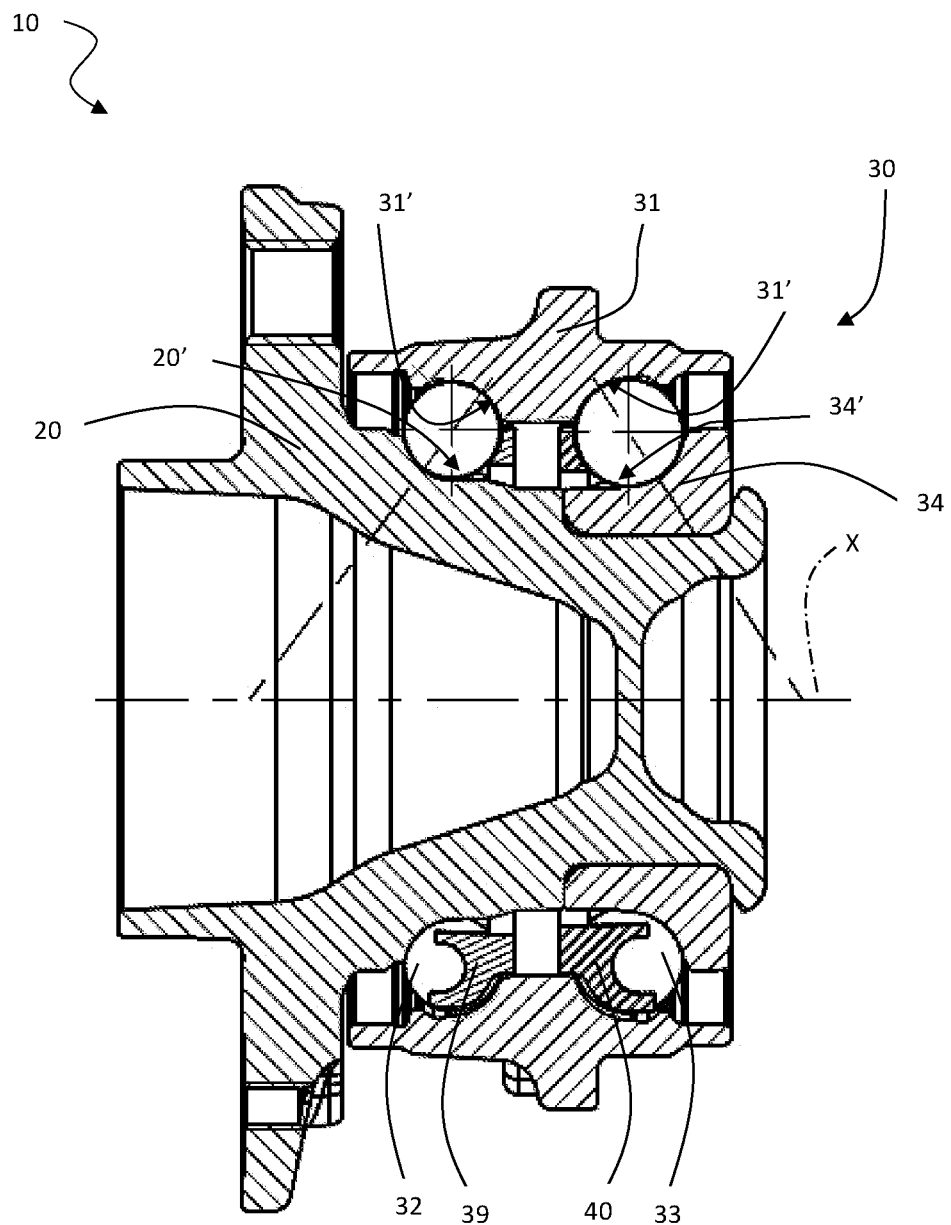
FIG. 1 is a partial cross-section through a bearing unit provided with two cages for containing and retaining balls according to exemplary embodiments of this disclosure.

A retaining cage according to exemplary embodiments of this disclosure is suitable for bearing units, in particular rolling bearing units. The exemplary embodiments are suitable in particular, although not exclusively, for the wheel hub assemblies of motor vehicles, said assemblies being provided with a bearing unit. These applications comprise both the arrangement where the outer ring of the bearing unit is rotating, while the inner ring of the bearing unit is fixed, and the opposite arrangement where the inner ring rotates and the outer ring is fixed. This disclosure is applicable, advantageously but not exclusively, to a bearing unit having a double row of balls.

A first type of retaining cage has a rib that is a continuous structural element which extends circumferentially along the cage and forms a solid base so as to provide the cage overall with the necessary rigidity for keeping the balls of each row circumferentially equally spaced along the raceways of a bearing.

A second type of retaining cage differs from the first type in that the plurality of fingers extends from only one side of the rib and, for structural strength reasons, the cage is also provided with a second radially outer rib.

Owing to the rolling movement of the balls with respect to the raceways of the bearing unit rings, the relative movement of ball and cage is a more or less sliding-contact movement, namely a displacement of the equatorial zone of the ball with respect to the cage. Consequently, such a sliding-contact movement may result in the generation of a very large amount of sliding friction. Such a high sliding friction between cage and ball may result in a greater dissipation of energy in the form of heat flow.

In recent years there has been a growing interest in the idea of reducing the friction in bearing units as a way of improving the overall performance of the vehicle and responding to the future needs of the market in terms of $CO_2$ emissions and electrification. It is desirable to achieve a reduction in the friction equivalent to 20% compared to the prior art.

Applicant has designed, a cage configured in such a way that the contact points between ball and cage are reduced and move towards the polar region of the ball, thus reducing the relative speeds of sliding movement of the points of contact between the ball and cage and consequently the sliding friction. This solution, while solving the aforementioned technical problem, requires further improvements. In particular further measures are needed to prevent, during the operational working conditions of the bearing unit, contact between adjacent balls inserted inside the cage, said contact causing an unacceptable noise for the end users and, obviously, also resulting in greater wear of the said rolling bodies.

Various embodiments of this disclosure provide a retaining cage for rolling bodies (in particular balls) of a bearing unit which does not have the aforementioned drawbacks. In other words, it reduces the sliding friction force which occurs between the cage and the rolling bodies and, consequently, reduces also the dissipated heat flow, while at the same time avoiding contact between the rolling bodies and, consequently, eliminating the drawbacks such as noisiness, false brinelling and unsatisfactory wear of the component.

According to various embodiments, friction is reduced between rolling bodies, for example balls, and retaining cages for the bearing units of wheel hub assemblies.

According to various embodiments, a retaining cage has localized points of contact with the rolling bodies configured to reduce the friction between the rolling bodies and retaining cages. These contact points are protrusions defined inside the cavities, namely along the partially spherical concave surfaces of the fingers and the base rib of the retaining cage, so as to localize the contact at specific points and reduce the contact area between the cavity of the cage and the rolling body, thereby reducing the sliding friction between cage and rolling body.

According to various embodiments, contact is avoided between adjacent rolling bodies by the localized arrangement of at least one pair of protrusions, preferably two pairs, in the intermediate portion of the cavities, in other words at least one protrusion, or preferably two protrusions, along the partially spherical concave surfaces of the fingers of the retaining cage.

Purely by way of non-limiting examples, the present disclosure will now be described with reference to a wheel hub assembly for motor vehicles provided with a rolling bearing.

With reference to FIG. 1, 10 denotes in its entirety a wheel hub assembly according to exemplary embodiments of the disclosure. The figures shows a detail of examples of the configuration.

The assembly 10 has a central axis of rotation X and comprises a wheel hub 20 which is preferably, but not necessarily, stationary and a bearing unit 30 in turn comprising:
- a radially outer ring 31 which is preferably, but not necessarily, rotatable;
- a radially inner ring 20 defined by the hub 20;
- a further radially inner ring 34 mounted stationary on and integral with the hub 20;
- two rows of rolling bodies 32, 33, in this example balls, arranged between the radially outer ring 31 and the radially inner rings 20 and 34; and
- two cages 39 and 40 for keeping in position the rolling bodies of the rows of rolling bodies 32, 33.

In the whole of the present description and in the claims, the terms and the expressions indicating positions and orientations such as "radial" and "axial" are understood as referring to the central axis of rotation X of the bearing unit 30, where not otherwise specified. Expressions such as "axially external" and "axially internal" instead relate to the assembled condition of the wheel hub assembly and, in the case in question preferably relate, respectively, to a wheel side and to a side opposite to the wheel side. For the sake of simplicity, the term "ball" may be used by way of example in the present description and in the attached drawings instead of the more generic term "rolling body" (and likewise the same reference numbers will be used).

In various embodiments, the radially outer ring 31 may be provided with two respective radially outer raceways 31', while the radially inner rings 20, 34 may be provided with respective radially inner raceways 20', 34' for allowing rolling of the axially outer row of rolling bodies 32 arranged between the radially outer ring 31 and the hub 20, and the axially inner row of rolling bodies 33 between the radially outer ring 31 and the radially inner ring 34.

According to various embodiments, the retaining cages 39, 40 may have protrusions making localized contact with the rolling bodies 32, 33. These protrusions are defined in the cavities of the retaining cage.

Figure 2:
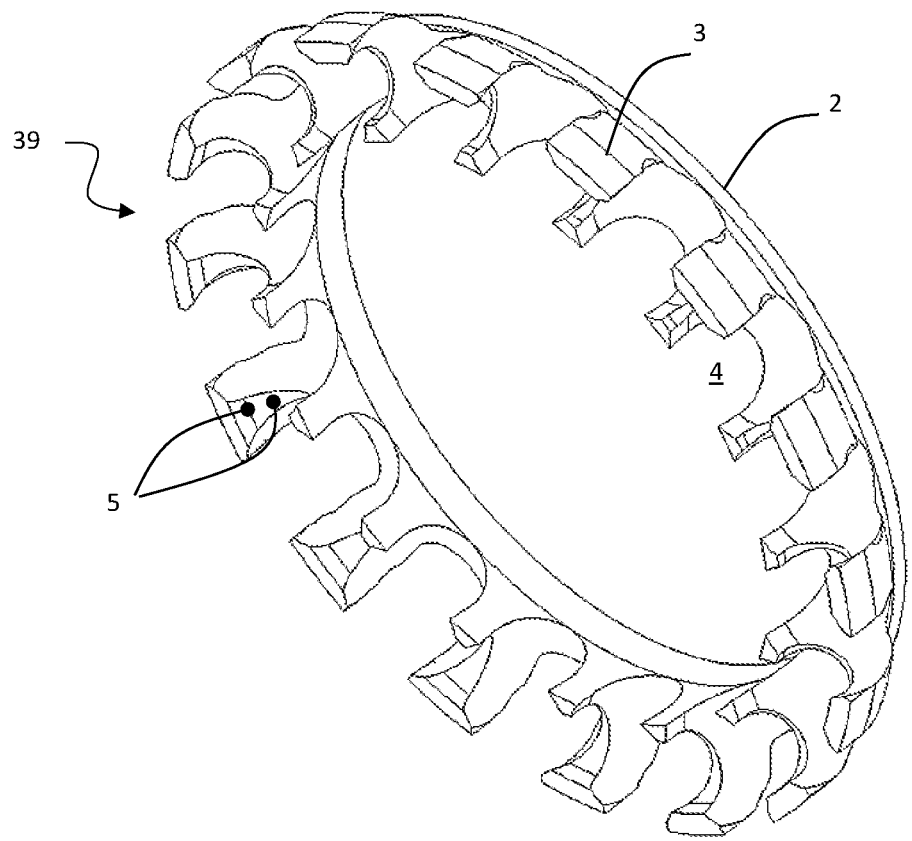
FIG. 2 is an axonometric view of a first type of retaining cage for rolling bodies according to exemplary embodiments of this disclosure.

With reference to FIG. 2, a first type of cage 39 may include a circular base rib 2 and a plurality of circumferentially spaced fingers 3 which extend from both sides of the rib 2. The base rib 2 and the fingers 3 may have partially spherical concave surfaces defining together a plurality of partially spherical cavities 4 or recesses for retaining respective balls by means of contact protrusions 5. More precisely, each cavity 4 may be defined by the partially spherical concave surfaces of the rib 2 and a pair of fingers 3.

Figure 3:
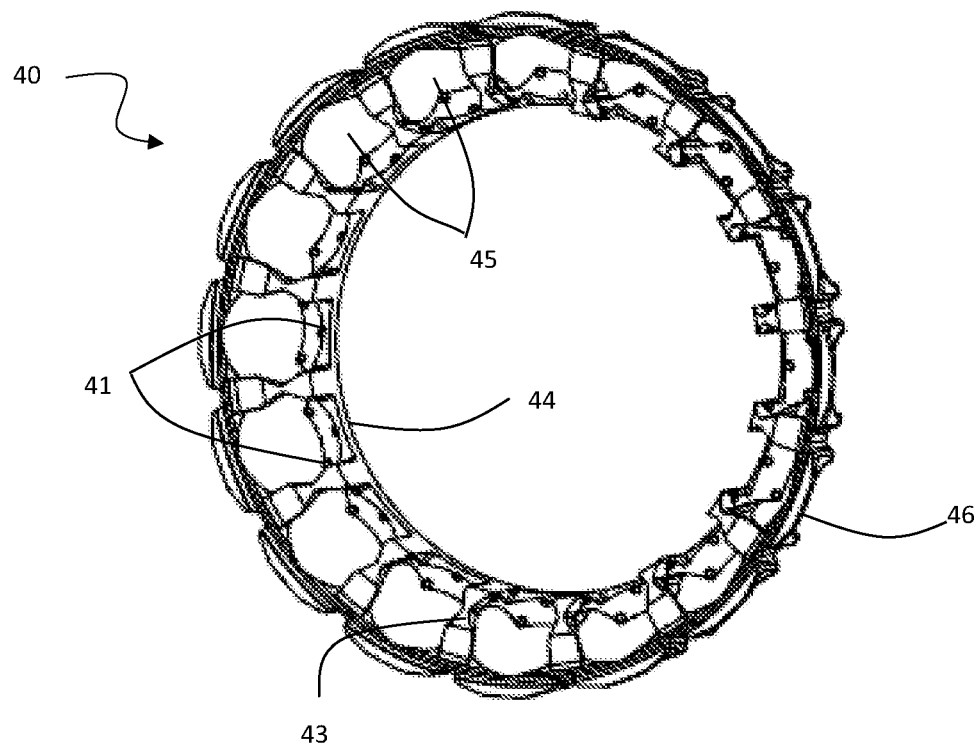
FIG. 3 is an axonometric view of a second type of retaining cage for rolling bodies according to exemplary embodiments of this disclosure.

FIG. 3 shows, in a three-dimensional view, a second type of retaining cage 40 according to various embodiments of the disclosure. The cage may include a base rib 44 and a plurality of circumferentially spaced fingers 43 which extend from one side of the rib. Advantageously, for structural strength reasons, the cage may also be provided with a second radially outer rib 46. The base rib 44, the fingers 43 and the second rib 46 have partially spherical concave surfaces defining together a plurality of partially spherical cavities or recesses 45 for retaining respective balls via the protrusions 41.

In order to contain the maximum amount of balls, the material of the cage may be removed around the minimum distance between two adjacent balls and in this way the fingers 43 will have a C-shaped form.

Therefore, for this type of cage, each cavity 45 may be defined by the partially spherical concave surfaces of the base rib 44, of a pair of fingers 43 and of the radially outer second rib 46.

As mentioned, the various embodiments may define a plurality of protrusions in the cavities of the cage in order to localize the contact between cage and balls in small areas and avoid contact between adjacent rolling bodies. These protrusions may therefore be formed first and foremost on the lateral surfaces of the cavities namely of the fingers 43. The protrusions may be obtained directly from modification of the mold for injection-molding of the retaining cages.

The various embodiments are applicable to both types of retaining cages. For simpler illustration, below reference will be made to the second type of cage, i.e. that shown in FIG. 3, but the comments made will also be applicable—except where otherwise suitably indicated—to the first type of retaining cage, shown in FIG. 2.

Figure 4:
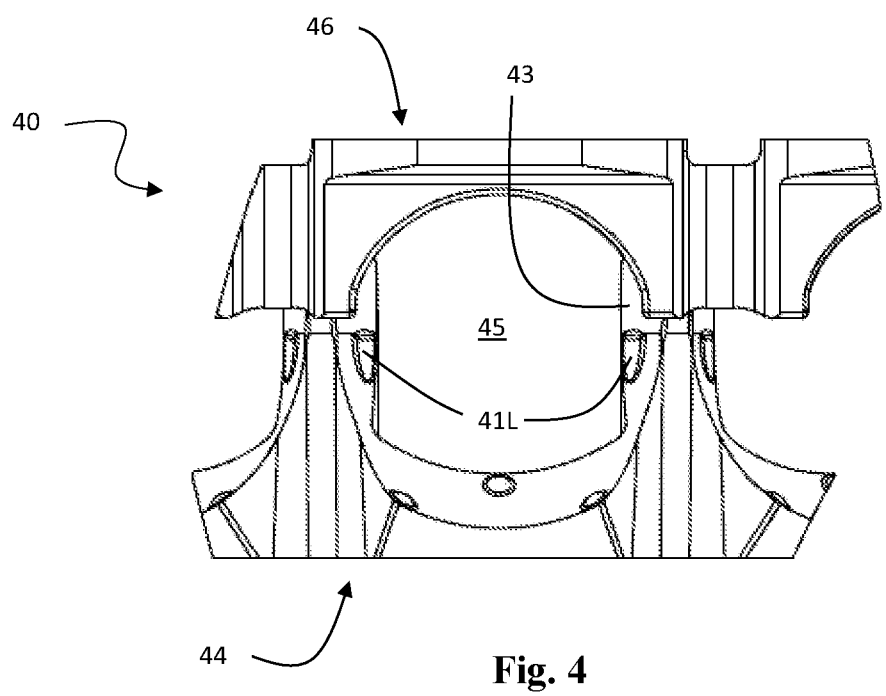
FIG. 4 is a partial axonometric view of the upper portion of a cavity of the retaining cage according to FIG. 3.

According to various embodiments, with reference to FIG. 4, the lateral protrusions 41L may be formed on the fingers 43 of the retaining cage 40 (or on the fingers 3 of the retaining cage 39) and advantageously there will be two protrusions for each finger, namely four protrusions for each cavity 45. The presence of the lateral protrusions 41L is able to ensure a separation between adjacent rolling bodies and therefore the absence of any contact. Moreover, by reducing the volume available to the ball inside the cavity, these lateral protrusions increase the ball retaining capacity of the cages.

Figure 5:
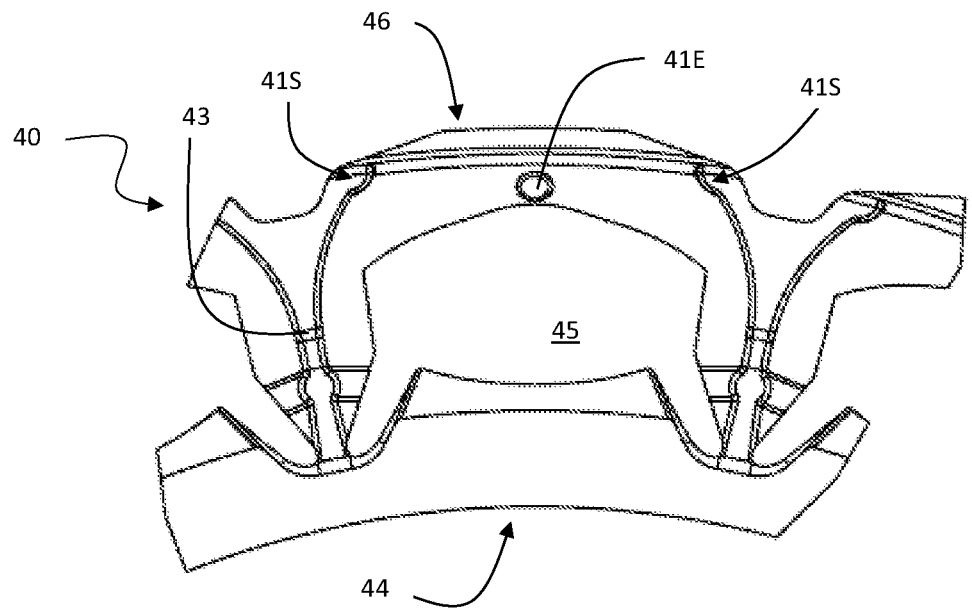
FIG. 5 is a partial axonometric view of the intermediate portion of a cavity of the retaining cage according to FIG. 3.
Figure 6:
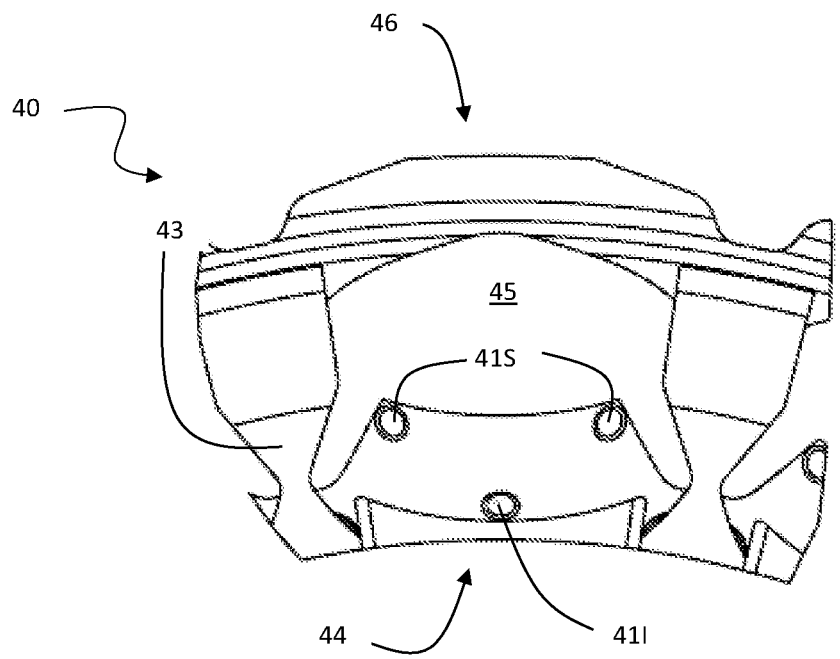
FIG. 6 is a partial axonometric view of the lower portion of a cavity of the retaining cage according to FIG. 3.

According to various embodiments, as shown in FIGS. 5 and 6, the fingers 43 of the cage 40 (but also the fingers 3 of the cage 39) may be provided with end protrusions 41S, for example a radially inner protrusion (FIG. 6) and a radially outer protrusion (FIG. 5). More precisely, the end protrusions 41S may be located on each proximal and distal end of the fingers, proximal end being understood as being the end in contact with the base rib 2, 44 and distal end being understood as being the end on the opposite side. In this case, therefore, there may be four end protrusions inside the cavity 4, 45. The end protrusions increase significantly, by up to about 20% the ball retaining force of the cage, this being a very advantageous condition during the process for assembly of the balls inside the cage as well as for handling and transportation of the cage itself.

For its closed configuration, the cavity 45 (but not the cavity 4 of the cage 39 because it has an open form) may also be provided with a radially inner central protrusion 41I centered on the internal lateral surface of the radially inner base rib 44 (FIG. 6) and a radially outer central protrusion 41E, centered on the internal lateral surface of the radially outer second rib 46 (FIG. 5).

Therefore, according to various embodiments, the cavity 45 of retaining cage 40 may be provided with four lateral protrusions 41L, four end protrusions 41S and two central protrusions 41I, 41E, for a total of ten protrusions.

According to various embodiments, the protrusions may be formed with a projecting height of between about 0.2 mm and about 0.4 mm. A minimum value may be about 0.2 mm. The diameter of the protrusions may be in the range of between about 1 mm and about 2.5 mm, and may be about 1.5 mm. In addition to having a broad dimensional range, the protrusions are not limited by particular forms, it being possible to use circular, elliptical, quadrangular and other forms.

Basically, owing to the fact that the area of contact between cage and ball is significantly reduced, the quantity of sliding friction generated is also reduced. According to calculated estimates, the reduction in the loss of power due to friction in the cage is equal to about 85% under no-load conditions and about 40% under load conditions.

In addition to the exemplary embodiments of the disclosure, as described above, it is to be understood that numerous further variants exist. It must also be understood that said embodiments are only examples and do not limit either the scope of the invention, nor its applications, nor its possible configurations. On the contrary, although the description provided above enables the person skilled in the art to implement the present disclsoure at least in one of its examples of configuration, it must be understood that numerous variations of the components described are feasible, without thereby departing from the scope of the disclosure, as defined in the accompanying claims, interpreted literally and/or in accordance with their legal equivalents.

We claim:

1. A bearing unit comprising:
    at least one row of rolling bodies; and at least one cage for retaining the rolling bodies; wherein the at least one cage comprises:
        a base rib comprising partially spherical concave surfaces;
        a plurality of fingers spaced circumferentially and extending at least from one side of the base rib, said fingers also comprising partially spherical concave surfaces;
        a plurality of partially spherical cavities for holding the rolling bodies, each cavity being defined by the partially spherical concave surfaces of a pair of fingers of the plurality of fingers and of the base rib;
        a radially outer second rib and each cavity of the plurality of cavities is defined by the partially spherical concave surfaces of a pair of fingers of the plurality of fingers, of the base rib and of the second rib;
    wherein the rolling bodies and the cages are in contact with each other via a plurality of protrusions formed on the partially spherical concave surfaces of the fingers and of the base rib,
    wherein the plurality of protrusions comprises:
        at least one lateral protrusion formed along the surface of each finger of the plurality of fingers of the cage; and
        a radially inner central protrusion, centered on the internal lateral surface of the radially inner base rib and a radially outer central protrusion, centered on the internal lateral surface of the second rib.

2. The bearing unit of claim 1, wherein the at least one lateral protrusion comprises a pair of lateral protrusions for each finger of the plurality of fingers.

3. The bearing unit of claim 1, wherein the plurality of protrusions comprises end protrusions located on each proximal and distal end of each finger of the plurality of fingers.

4. The bearing unit of claim 1, wherein the plurality of protrusions comprises four lateral protrusions and four end protrusions in each cavity.

5. The bearing unit of claim 1, wherein each protrusion of the plurality of protrusions has a height whose value is between about 0.2 mm and about 0.4 mm.

6. The bearing unit of claim 1, wherein each protrusion of the plurality of protrusions has a diameter whose value is between about 1 mm and about 2.5 mm.

7. A wheel hub assembly for motor vehicles, comprising:
    a hub; and
    a bearing unit comprising:
        a radially outer ring provided with respective radially outer raceways;
        at least one radially inner ring provided with respective radially inner raceways;
        at least one row of rolling bodies between the radially outer ring and the radially inner ring; and
        at least one cage, wherein the at least one cage comprises:
            a base rib comprising partially spherical concave surfaces;
            a plurality of fingers spaced circumferentially and extending at least from one side of the base rib, said fingers also comprising partially spherical concave surfaces;
            a plurality of partially spherical cavities for holding the rolling bodies, each cavity being defined by the partially spherical concave surfaces of a pair of fingers of the plurality of fingers and of the base rib;
            a radially outer second rib and each cavity of the plurality of cavities is defined by the partially spherical concave surfaces of a pair of fingers of the plurality of fingers, of the base rib and of the second rib;
        wherein the rolling bodies and the cages are in contact with each other via a plurality of protrusions formed on the partially spherical concave surfaces of the fingers and of the base rib, and
        wherein the plurality of protrusions comprise:
            at least one lateral protrusion formed along the surface of each finger of the plurality of fingers of the cage; and
            a radially inner central protrusion, centered on the internal lateral surface of the radially inner base rib and a radially outer central protrusion, centered on the internal lateral surface of the second rib.

8. The wheel hub assembly of claim 7, wherein the at least one lateral protrusion comprises a pair of lateral protrusions for each finger of the plurality of fingers.

9. The bearing unit of claim 1, wherein the plurality of protrusions comprises end protrusions located on each proximal and distal end of each finger of the plurality of fingers.

10. The bearing unit of claim 1, wherein the plurality of protrusions comprises four lateral protrusions and four end protrusions in each cavity.

11. The wheel hub assembly of claim 7, wherein each protrusion of the plurality of protrusions has a height whose value is between about 0.2 mm and about 0.4 mm.

12. The wheel hub assembly of claim 7, wherein each protrusion of the plurality of protrusions has a diameter whose value is between about 1 mm and about 2.5 mm.

* * * * *